(No Model.) 6 Sheets—Sheet 1.
I. W. LAMB.
KNITTING MACHINE.

No. 355,938. Patented Jan. 11, 1887.

WITNESSES:
Fred G. Dieterich
W. X. Stevens.

INVENTOR:
I. W. Lamb
BY Munn & Co
ATTORNEYS.

(No Model.) 6 Sheets—Sheet 3.

I. W. LAMB.
KNITTING MACHINE.

No. 355,938. Patented Jan. 11, 1887.

WITNESSES:
Fred. G. Dieterich
W. X. Stevens

INVENTOR:
I. W. Lamb
BY Munn & Co
ATTORNEYS.

(No Model.) 6 Sheets—Sheet 4.

I. W. LAMB.
KNITTING MACHINE.

No. 355,938. Patented Jan. 11, 1887.

WITNESSES:
Fred. G. Dieterich
W. X. Stevens

INVENTOR:
I. W. Lamb
BY Munn & Co.
ATTORNEYS.

(No Model.) 6 Sheets—Sheet 5.
I. W. LAMB.
KNITTING MACHINE.

No. 355,938. Patented Jan. 11, 1887.

(No Model.) 6 Sheets—Sheet 6.

I. W. LAMB.
KNITTING MACHINE.

No. 355,938. Patented Jan. 11, 1887.

WITNESSES:
Fred. G. Dieterich
W. X. Stevens

INVENTOR:
I. W. Lamb
BY Munn & Co.
ATTORNEYS.

UNITED STATES PATENT OFFICE.

ISAAC WIXOM LAMB, OF JACKSON, MICHIGAN.

KNITTING-MACHINE.

SPECIFICATION forming part of Letters Patent No. 355,938, dated January 11, 1887.

Application filed May 27, 1885. Serial No. 166,871. (No model.)

*To all whom it may concern:*

Be it known that I, ISAAC WIXOM LAMB, a citizen of the United States, residing at Jackson, in the county of Jackson and State of Michigan, have invented certain new and useful Improvements in Knitting-Machines, of which the following is a description.

This invention relates to that class of knitting-machines in which two straight parallel rows of needles are employed, generally known as "Lamb knitting-machines." Among patents under which the same receives protection is one dated September 15, 1863, No. 39,934.

The object of my invention is to improve the machine in many of the details of construction to enable the machine to do a greater variety of work, to be run faster, and to be more easily adjusted for different kinds of work, and at the same time to render its construction more methodical, cheaper, and more durable.

To this end my invention consists in the construction and combination of parts comprised in a knitting-machine, hereinafter described and claimed, reference being had to the accompanying drawings, in which—

Fig. 14 is a detailed plan view of the yarn-guide and arm, showing the slot within which the connection between the arm and its friction-rod works, parts being broken away.

A represents the frame of the machine, comprising the two end portions, A', and a connecting part, A'', all usually cast in one piece. The frame is provided with clamping-screws $a$, by means of which the machine may be secured at its back edge to a bench or table for support while in use. I have shown a pair of metallic brackets, $a'$, which may be permanently secured to the bench to serve as bases on which to secure the machine to guard the wooden bench against wear in frequently placing and removing machines.

Figures 4, 5:
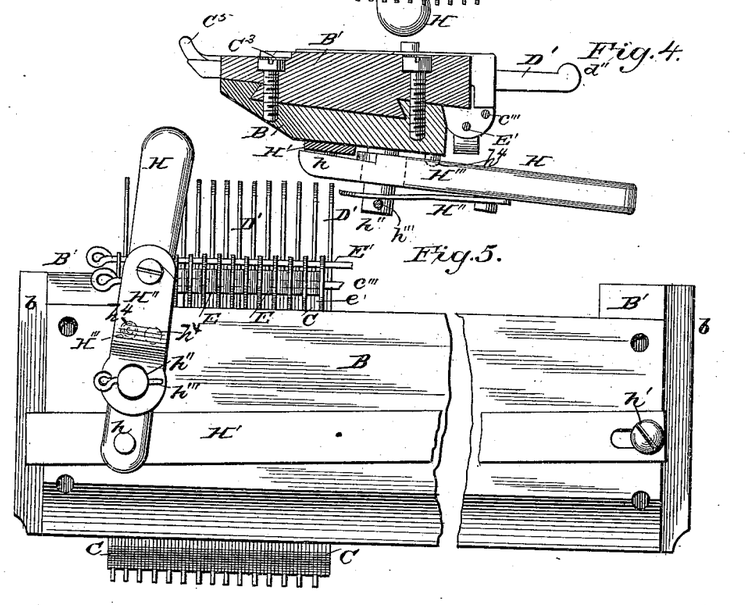
Fig. 5 is an inverted plan view of the bed plate frame, the bed-plate, and its endwise shifting mechanism, together with a number of the needles and bed-sections, including springs between and upon which the needles slide, and the spring and needle-retaining rods, a portion of said bed-plate and its shifting mechanism being broken away.
Figures 6, 13:
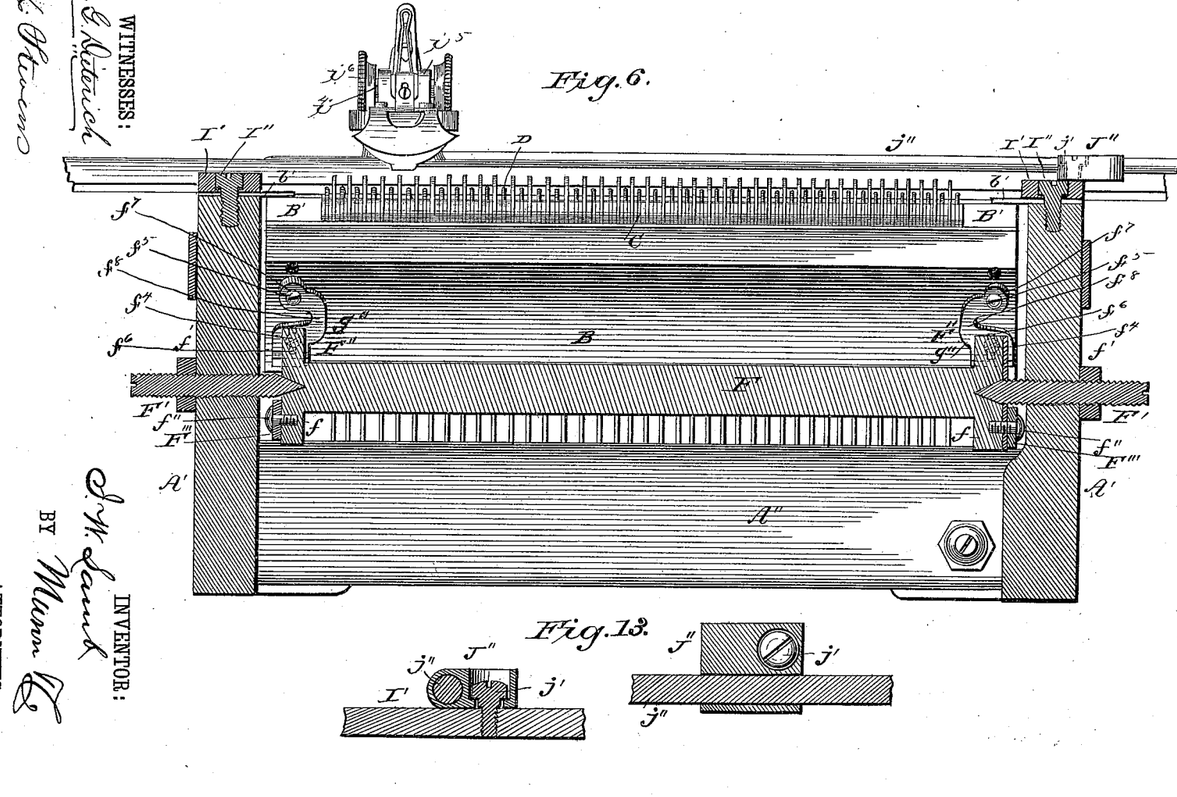
Fig. 6 is a longitudinal section at $yy$, Fig. 2.
Fig. 13 shows sectional views of adjunctive parts of the oscillating appliance of the yarn-guide.
Figure 7:
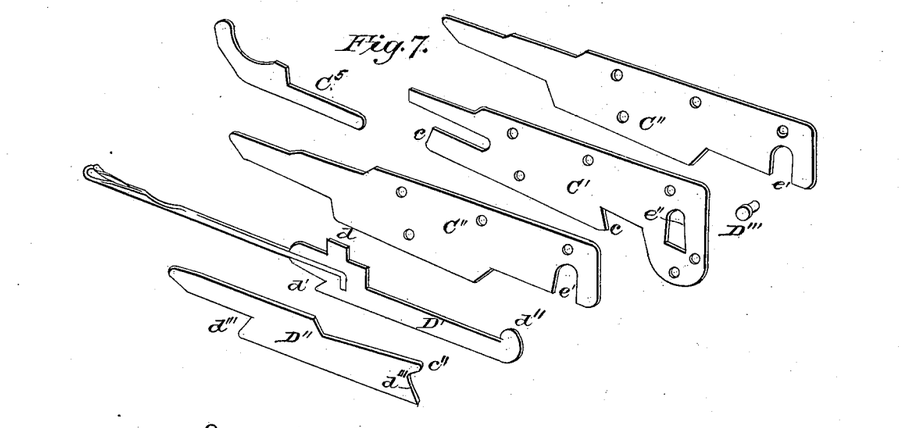
Fig. 7 shows the parts of a bed-section in detail and the needle.
Figure 10:
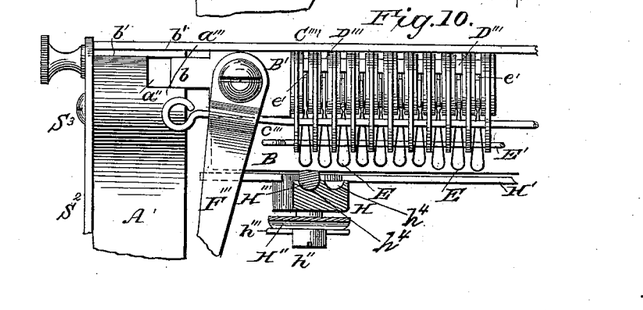
Fig. 10 is an out end view, partly in section, of a portion of the machine corresponding with that shown in Fig. 3.
Figure 11:
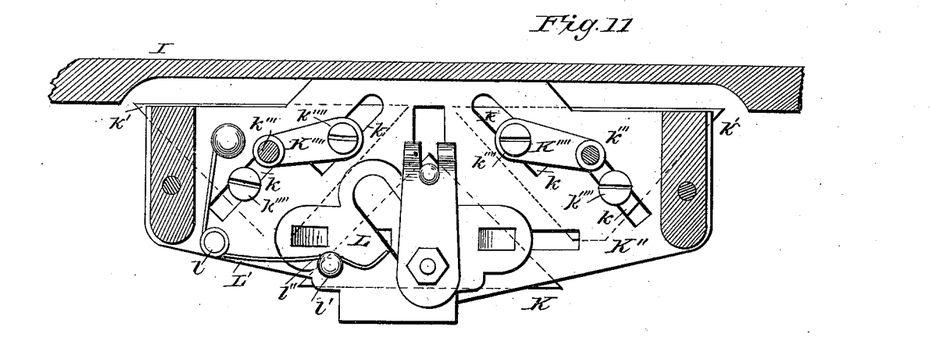
Fig. 11 is a longitudinal section through the cam-carriage.

The upper edges of the end portions, A', are slanted to the front and rear at an angle of about forty-five degrees, and are provided with grooves $a''$ along their inner corners, (see Fig. 10,) forming ledges $a'''$, on which the bed-frame is fitted to slide both longitudinally and transversely, said ledges being of greater length between their inner and outer ends than the end blocks of the said frame, while said frame is less in length from side to side than the space between the opposite vertical side walls of the said grooves. Each bed-frame comprises the bed-plate B, the end blocks, B', and a retaining-bar, C'''. The bed-plate is dovetail grooved longitudinally in its upper face to receive the bed-sections C and the end blocks, B', which are provided with corresponding dovetails to fit snugly into the groove. The end blocks are further secured to the bed-plate by means of screws, (see Fig. 4,) so as to become rigid parts thereof, and are provided each with a rib, $b$, fitted to slide upon the ledges $a'''$. (See Fig. 5.)

Figure 3:
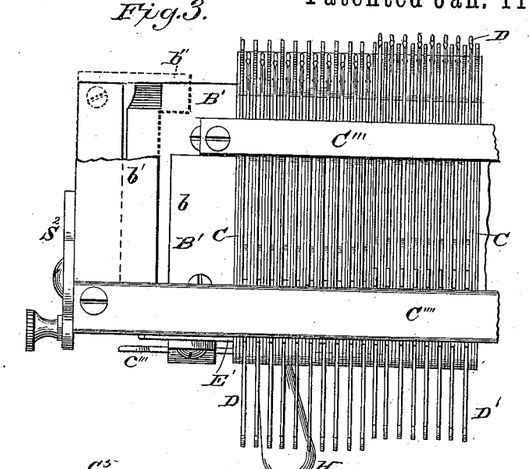
Fig. 3 is a view of a portion of the front of the machine with the cam-frame removed.

$b'$, Fig. 3, is a gib screwed flat upon each of the inclined sides of the end portions, A', to project over the ribs $b$ to hold them in place on the ledges $a'''$. The upper faces of the end blocks are gained (see Fig. 10) to receive the gibs level with the surface of the blocks, and to form a shoulder at each of their upper or inner ends to come against projecting shoulders $b''$ of the gibs to form stops to the inward transverse motion of the bed-plates.

D is a needle of the usual hook and hinged tongue form at its forward end, bent at a right angle near the rear end of its body, and provided with a shank, D', which is slotted at its forward end to receive the rear end of the body of the needle bent as described. In practice, the needle and shank thus joined are soldered together, and become one piece called the "needle."

$d$ is a projection of the shank, by which the cams act upon the needle to reciprocate it, this projection being called the "heel."

$d'$ is a hook-shoulder, by which the needle is prevented from being pulled forward at certain times, as hereinafter explained.

$d''$ is a knob, by which the needle may be drawn backward by hand.

The bed-sections C comprise the central piece, C', the two side pieces, C'', and the bed piece D'', forming a group, and the spacing-stud D'''. The central piece, C', has a parallel-sided opening at its forward end to receive the jack $C^5$, which is secured therein by fitting so closely as to require endwise driving to force it in, and by the side pieces, C'', which are duplicates of each other, and are riveted firmly to the central piece. The central piece may have the jack formed as a part thereof; but as the jack is worn more rapidly than the rest of the central part I prefer making it removable that it may be changed at will. The central piece, C', has a dovetail, $c$, fitting closely into the dovetail groove in the bed-plate B, whereby the body of each section is held. The bed-pieces D'' are also provided each with a dovetail, $d'''$, to fit the dovetail groove in the bed-plate, and the bed-sections and bed-pieces alternating fill the bed-plate between the end blocks, B'. The body of the spacing-stud D''' passes through and is riveted to the group of parts C'' C' C'' of the bed-section, and its head projects an amount equal to the thickness of the bed-piece D''.

Between adjacent bed-sections, above the bed-pieces and below and in front of the studs, is the needle-groove, formed by assembling the surrounding parts, as described. The needles are retained in these grooves by the forward bar, C''', which is secured upon the end blocks, B', of the bed-plate, and by the rear bar, C'''', which is secured upon the end portions, A', of the frame. The line of the needle-body and the line of the shank are parallel, the former sliding on the forward part of the bed-piece, while the latter slides on the lower rear portion thereof in service.

To enable the needles to be held out of operation when desired, I provide the hooking shoulders $d'$ upon the needle and $c''$ upon the bed-piece to engage each other as follows: The needle, after being drawn as usual by hand into its outward or rearward position, is pressed down to withdraw its heel from the path of the operating-cams. The weight of the work will then draw the needle forward, so as to engage the said hook $d'$ with the shoulder $c''$. The hooking form of part $d'$, prevents the weight of the work from either drawing the needle forward or from prying the hook up out of engagement with the shoulder.

Figure 9:
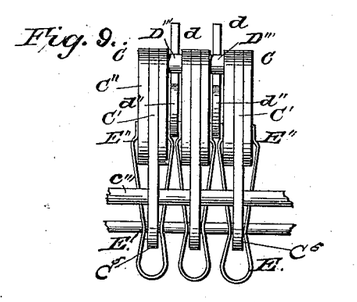
Fig. 9 is a similar view showing a modification of the needle-supporting springs.

At each movement of the needle in operation the hook $d'$ passes back of the shoulder $c''$, and would be very likely to drop down into engagement therewith. To prevent this I have provided springs E, with shoulders $e$, between and upon which the needles may slide, so as to be supported when not supported by the bed-piece. The inner faces of the spring below the shoulders $e$ touch, while the points of the spring above the shoulders are so far apart as to permit the needle to play freely between them. The shoulders of the spring are not so abrupt but that the needle-shank may be pressed down between them by applying a little force when it is desired to disengage a needle from the cams. The springs E are held in place between the central pieces, C', by a small rod or wire, E', which passes through the springs and through the central pieces. The upper ends of the springs occupy the spaces $e'$ in the side pieces, C'', and are kept thereby from turning on the wire. Spaces $e''$ are formed in the central pieces, C', to permit the ends of the spring to recede from the needle when the latter is pressed down between the shoulders $e$. As a modification, the loop-shaped springs E may also be made with their shoulders turned outward, as at E'', Fig. 9, in which case the two legs of a spring will straddle the central piece, C', and the shoulders of two adjacent springs will come together to support the needle, each spring, except the two end ones of the machine, acting in conjunction with the two adjacent springs.

Figures 1, 4:
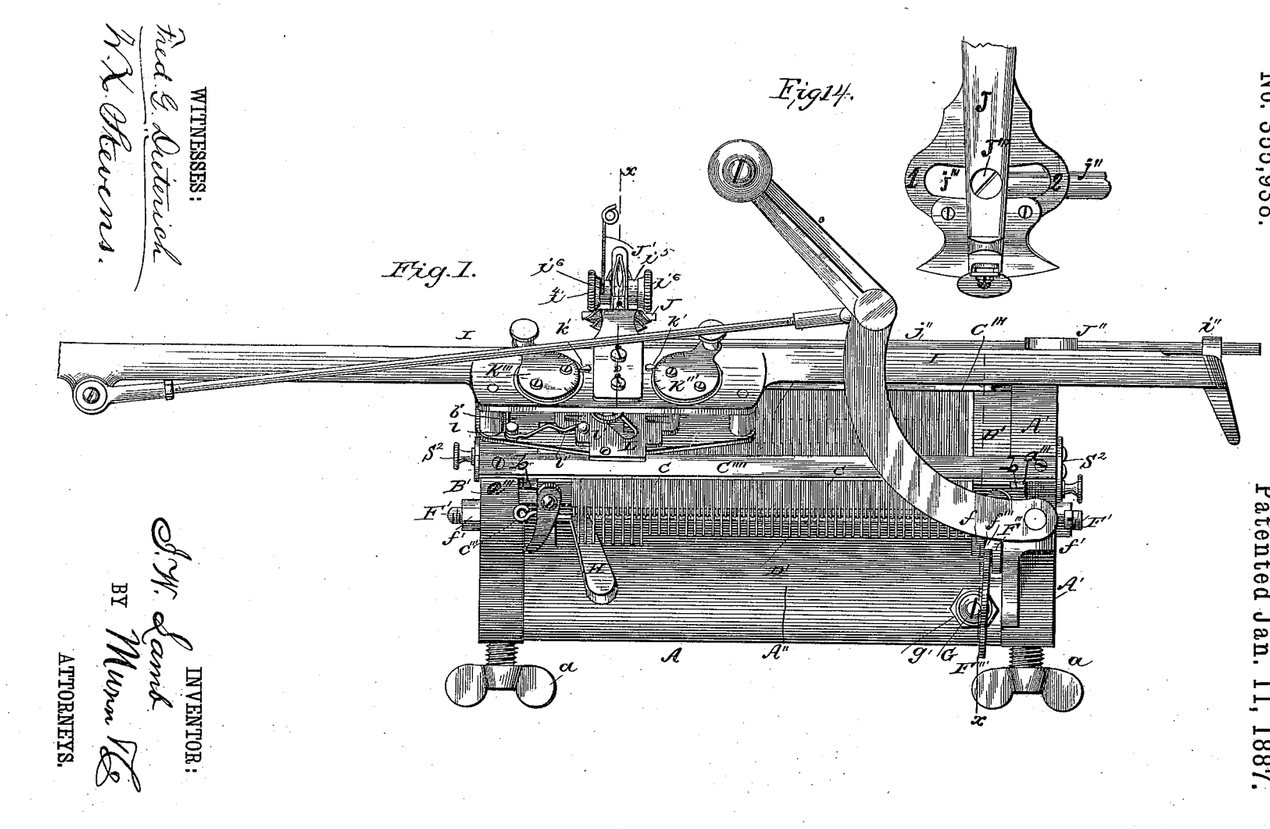
Figure 1 is a front elevation of a knitting-machine according to my invention.
Fig. 4 is a transverse vertical section through the bed-plate frame.
Figure 2:
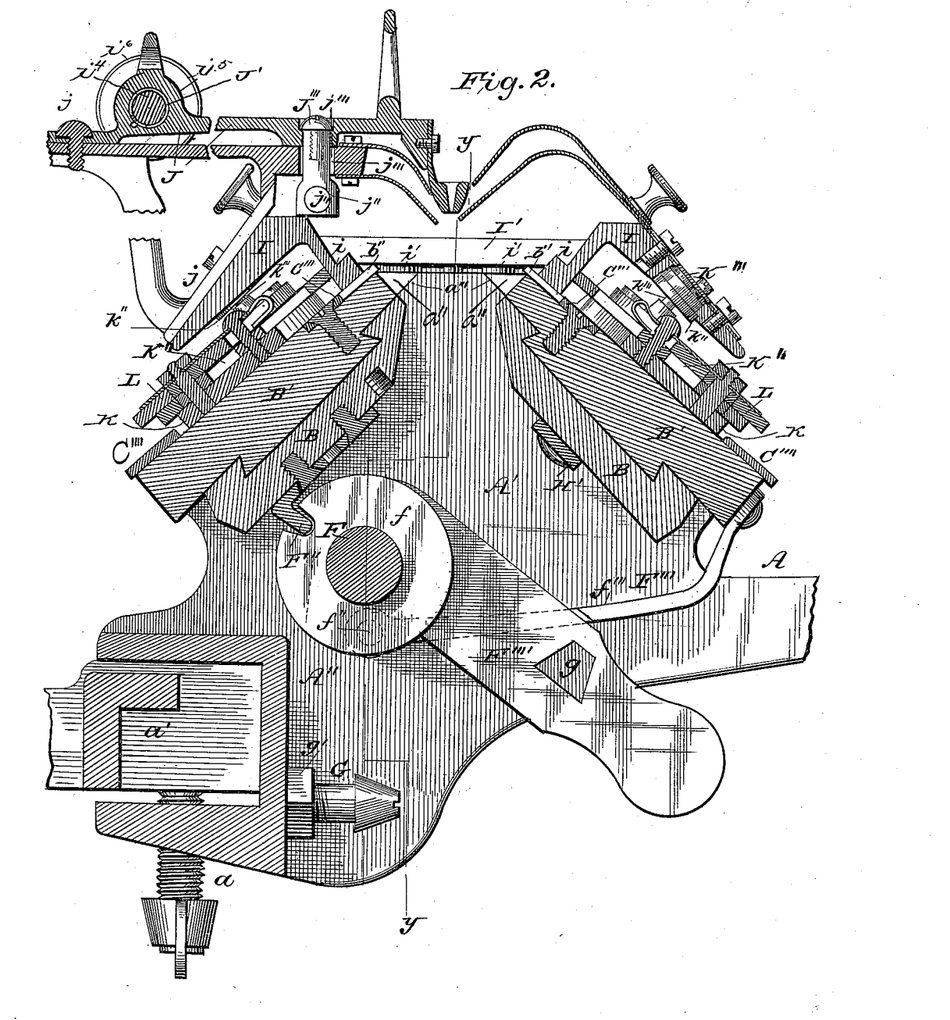
Fig. 2 is a transverse vertical section of the same at $xx$, Fig. 1, looking toward the right-hand end of the latter figure.
Figure 8:
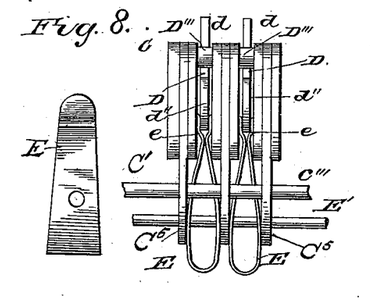
Fig. 8 is an out end view of several sections having the parts thereof assembled together as in service, the said figure including a number of needle-supporting springs, one of the latter being also shown detached and in side view, and portions of the same spring and needle-retaining rods.

$c'''$, Figs. 4 and 8, is a rod or wire passing through the central pieces, C', beneath the needle-shanks to retain the needles in the machine by preventing the heels of the needles being drawn back under the spacing-studs D'''. By withdrawing this rod endwise the needles will be free to be pressed down enough to be removed rearward from the machine.

F is a rock-shaft provided with a flange, $f$, at each end, and mounted on adjusting screw-centers F'. These screw-centers pass through the end portions, A', and are provided with check-nuts $f'$, by which they may be rigidly fixed at any point of adjustment.

F'' represents two teeth fixed to the rear bed-plate, B, each to engage a notch in one of the flanges $f$.

F''' represents two connecting-rods attached at one end to the front bed-plate, B, and at the other end to crank-pins $f''$ in the flanges.

F'''' is a hand-lever attached to one end of the rock-shaft F, by means of which the shaft may be rocked, when by the tooth-connection F'' and the rod-connection F''' the two bed-plates will be separated or drawn together. They are thus separated, carrying the needles with them, to allow the operator room to do any desired work between the two plates, such as taking up loops, &c.

For the purpose of adjusting the teeth F''' relatively to each other when setting up the machine, the teeth are provided with curved bases $g''$, to be attached by two screws, $f^4 f^5$, to the bed-plate. One of these screws, $f^4$, passes through an elongated hole, $f^6$, in the base, at one end of the curve, and the other screw, $f^5$, is fixed in a round hole, $f^7$, at the other end, and by crooking the metal of the curved portion $f^8$ more or less the tooth may be set relatively to the fixed screw, and then be bound by the other screw.

G is a stop-screw having a conical head to engage an aperture, $g$, in the lever F'''', which has an elastic body, so that it may be crowded to one side by the conical shape of the screw-head G, and spring back when the aperture $g$ arrives at the screw-head, to hold the rock-shaft fixed when the bed-plates are forward, and to fix the position of these plates with any desired amount of opening between them I fit the stop G with a screw-thread to enter the portion A'' of the frame, and I provide a check-nut, $g'$, to hold the screw set. To limit the action of the lever F'''' in separating the plates, I provide a shoulder, $f'''$, on one of the connecting-rods F''', which stops the lever at a fixed point.

For producing certain kinds of fabric—such as shagged work—I arrange the front needle-plate to be shifted endwise a distance equal to the space between adjacent needles. As the normal relation of the front and back sets of needles to each other is one set opposite the spaces between the other set, this shifting brings the two sets in a new relation to each other. To this end the front bed-plate, B, is made shorter than the space in the frame A between the outer vertical sides of the ledges $a''$, and the ribs $b$ may slide on the said ledges longitudinally of the machine an amount equal to the space between adjacent needles. This endwise movement of the whole needle-bed is accomplished, as described farther on, by means of a hand-lever, H, which is pivoted at $h$ to a bar, H', which is fitted closely between the end portions, A', of the frame, and slotted to receive a screw, $h'$, which holds it movably on the bed-plate B. The lever H has an enlarged hole to receive and play longitudinally upon the stud $h''$, which is fixed in the bed-plate.

H'' is a spring acting between the lever H and its retaining-pin $h'''$ to press the lever up against a pin, H''', fixed in the plate. The lever has two holes, $h^4$, as seen in dotted lines in Figs. 4 and 5 and in full lines in Fig. 10, at equal distances from the stud $h''$, in which to receive the pin—one when the needle-plate is at the right and the other when at the left. By pressing the handle of the lever down, overcoming in a measure the action of the spring H'', it is disengaged from the pin and may be moved either way, carrying the needle-plate with it.

I is the sliding frame for carrying the needle-operating cams. It is provided with two inwardly-projecting longitudinal ribs, $i$, the lower sides of which are fitted to bear on the gibs $b'$, to enable the frame I to slide longitudinally.

I' represents two gibs, each fitted neatly to the ribbed portions of the sliding frame I, to hold the latter in sliding engagement with the machine.

To regulate the closeness of fit of the gibs I' to the ribs $i$, I provide each with a central binding-screw, I'', which draws the gib down upon the sliding frame, and two pushing-screws, $i'$, which resist said binding. By this means the gib may be rigidly sustained just in contact with the frame without pressing on it, or they may be rigidly set a little free of the frame and yet hold the frame to its path. The screws $i'$ are provided with shoulders $i''$ $i''$, that press up against the under sides of the gibs, and with smaller heads, $i'''$ $i'''$, which come through the gibs just flush with the tops thereof, so that these screws may all be adjusted from above the gibs.

J is the yarn-guide arm, pivoted at $j$ to the yarn-carrier frame to oscillate thereon.

J' is the take-up spring, which is passed through a slot, $i^6$, in a hub-like portion, $i^5$, of the arm J, said spring being connected to or coiled around a headed bolt-pin, $i^4$, inserted into and through said hub-like portion of the arm J, so as to oscillate therewith and to remain in the same relation thereto at all times, and to hold the yarn directly over the yarn-delivery and with the same tension, whether the oscillating guide-arm be in its right or left position at the points designated by the figures 1 and 2, respectively, Fig. 14.

The pin-bolt $i^4$, with one end of the take-up spring J' connected thereto or coiled around it, as above intimated, is passed into and through the hub-like portion $i^5$ of the arm J, and secured therein by a shoulder on the inner side of its head, and a nut, $i^6$, screwed upon its unheaded end, which is screw-threaded and projects beyond the hub-like portion $i^5$ to receive said nut.

J'' is the friction-block which oscillates the arm J. This block is secured by means of a screw, $j'$, to one of the gibs I' loosely, so that it may accommodate itself to the movement of the friction-rod $j''$, to oscillate the yarn-guide at the right time, and be sure at all times to hold the yarn-guide in the position required. The screw $j'$ is provided with a shoulder at a distance below its head greater than the thickness of that portion of the block held below the head, and the head has a free fit in the block, thus giving the block the slight freedom required. (See Fig. 15.) The friction-block is practically attached to the frame A, the gib I', fixed to the frame, being a convenient point of attachment. The friction-rod $j''$ passes at one end freely through a projection, $i''$, of the sliding frame I as a support, and is provided at the other end with a stud and a screw, J''', which stud passes up through a slightly-curved slot, j''', in the yarn-carrier frame, the ball-head of the screw engaging a suitable socket in the yarn-guide arm J.

When the frame I starts from either end of its stroke to move across, the friction-block J'' will adhere to the friction-rod j'' enough to hold back the yarn-guide arm J until the stud is caught in one of the ends of the slot j''', when the rod will advance with the frame, the friction-block all the time resisting its movement, so as to hold the yarn-guide at the rear end of its sweep. When the frame arrives at the end of its stroke and starts to return, the friction-block will act in a similar manner to move the yarn-guide to the other end of its stroke and hold it there throughout the stroke of the frame. This means of holding the friction-block assures the shifting of the yarn-guide at the right time, thus obviating one of the most serious difficulties with which the operator of the Lamb knitting-machine has had to contend, and by securing these parts to the reciprocating frame, the removal of the frame becomes a simple matter, only requiring the unscrewing of the two screws I''.

The cams in this machine operate as usual, the set in the front being like the set in the back of the sliding frame, and each set consisting of three cams—one central or V cam and two wing-cams. The V-cam K on the front side of the machine is raised when it arrives at one end of the machine and lowered at the other end, and the like cam on the rear side of the machine is raised at that end of the machine where the front cam is lowered when producing tubular work. The wing-cams K' I make adjustable, for the purpose of regulating the length of the loop, as follows: The wing-cams K' are secured to the under plate, K'', of the frame I by means of screws, which slide in slots k parallel to the adjacent side of the cam K.

K''' are dials, each graduated on an arc of its face to register with a fixed pointer, k'. Each dial is provided with a handle, by which it may be turned, and is connected with a flanged disk, k'', so as to turn the same in the recess formed in the frame I.

k''' is a crank-pin on the disk k'', connected with a wing-cam, K', by means of a rod, K'''', and one of the two screws k'''', the screws passing through the slots k. By turning the dial the cam K' will be moved along the slots k, and the distance moved will be indicated by the pointer k' and the dial. When the cam is extended downward it will depress the needles farther and form longer loops or stitches, and vice versa. Each of the four wing-cams is similarly provided with a dial.

L represents the shifter for the cam K.

L' is a wire spring, which I have adapted to hold the shifter at each end of its movement. The spring is held directly to the under plate, K'', by a stud, l, and it is provided with an angular bend, l'', adapted to engage a stud or rivet, l', on the plate L, so that when the rivet passes the angle l'' either way it will be held thereby from slipping out of place. By this arrangement the spring is secured upon the same plate, K'', as the parts on which the spring acts, thus keeping all such parts together and in their proper relation to each other when the plate is removed. The spring is at the same time effective and cheap.

As the other details of this machine are in common use and familiar to the public in the Lamb knitting-machine, I have not thought it necessary to describe them.

Figure 12:
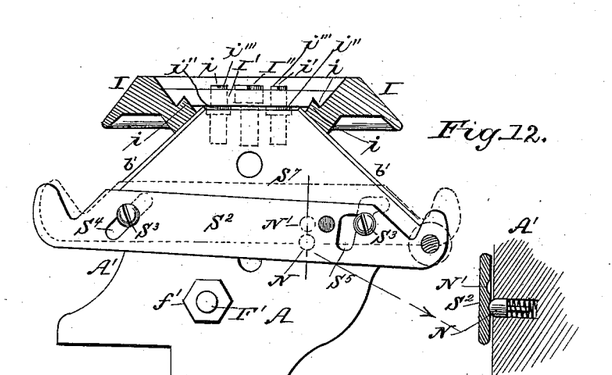
Fig. 12 is an end view of the frame or body of the machine, showing the sliding frame in section.

Heretofore it has been common to cause the cam-shifters L to operate by means of four separate stops at the ends of the machine, adapted to be set into or out of the path of the shifters. I have devised two stops, S², which accomplish the same purpose. Each of these stops is secured to the machine by means of two screws, S³, one fixed in the end of the machine through a straight inclined slot, S⁴, in the stop S², and the other through an angular slot, S⁵. If the stop be set as shown in Fig. 12, neither shifter will be engaged thereby. If set as shown in dotted lines S⁷, both shifters will be engaged. The stop is provided with three holes, N', to be engaged one at a time by a spring-actuating pin, N, whereby the stop is held in any of the positions described. These two shifters are more easily managed than four attached to the end of the machine, and they accomplish all that is desired.

What I claim as my invention, and desire to secure by Letters Patent, is—

1. The combination, with the frame A, having the ledges a''', and the bed-plate B, having the end blocks, B', formed with ribs b, of the gibs b', fitted to the frame A to project over the ribs b, the latter being gained on their upper faces to receive the gibs, as shown and described.

2. The combination, with the frame A, having the ledges a''', and the bed-plate B, having the end blocks, B', formed with ribs b and gained along their outer edges and across their upper ends, of the gibs b', fitted to the frame A to project over the ribs b, and provided with projecting shoulders b'', substantially as shown and described.

3. The combination, with the grooved needle-bed having shoulders c'' arranged within the grooves of said bed, of the needles having hooks d' upon their under sides, which hooks engage said shoulders within the grooves, whereby the needles are prevented from having endwise forward movement when depressed wholly within the grooves of the needle-bed, substantially as set forth.

4. The combination, with the grooved needle-bed having hooked shoulders c'' arranged within the grooves of said bed, of the needles having hooks d' upon their under side, which hooks engage said hooked shoulders, whereby the strain of the loops drawing endwise upon the hooks of the needles will effect the engagement of the said hooking shoulders and hooks, substantially as and for the purpose set forth.

5. The combination, with an unyielding bed having a hooked shoulder, of the needle having a hook, $d'$, on its under side, and the spring E, having a shoulder, $e$, and disposed in rear or outside of the shoulders of the bed, said needle being adapted to move or slide past said shoulder of the bed, substantially as and for the purpose specified.

6. The combination, with a series of groups of pieces, $C''$, $C'$, and $C''$, spacing-studs $D'''$, secured between the said groups and needles, fitted to slide in the spaces between the said groups and provided with hooking shoulders $d'$, of the bed-pieces $D''$, provided with hooking shoulders $c''$, adapted to engage the needle-hook shoulders, substantially as shown and described.

7. The combination, with the frame A, provided with the end portions, A', having the ledges $a'''$, and the gibs $b'$, secured on the end portions, A', of the bed-plate B, the end blocks, B', secured thereto and provided with ribs $b$, cut away on top to fit upon the ledges $a'''$ under the gibs $b'$, the reciprocating cam-frame, and the retaining-bar $C''''$, secured upon the end blocks B' level with the gibs $b'$, as shown and described, whereby an even surface is furnished for the reciprocating cam-frame to slide upon, as shown and described.

8. The combination, with a needle having a hook on its under side and a bed therefor having a shoulder past which the hook of the needle may slide, of a spring, E, having shoulders $e$, located to the rear of the shoulder in the bed to support the needle, as shown and described.

9. The combination, with the spring E, of the two side pieces, $C''$, having the spaces $e'$, the central piece, $C'$, having the space $e''$, and the rods E', passing through the springs and through the central pieces, substantially as shown and described.

10. The combination, with the frame A, the shaft F, pivoted to rock therein and provided with the flanges $f$, of the plate B, fitted to slide in the frame A, the crank-pins $f''$ in the flanges, and the connecting-rods $F'''$, attached at one end to the plate B and at the other end to the crank-pins $f''$, as shown and described.

11. The combination, with frame A and the shaft F, pivoted to rock therein, and plates B B, connected with the said shaft, as described, of the elastic lever $F''''$, fixed to the shaft and having the aperture $g$, and the conical-headed screw-stop G, adjustably fixed in the frame A, as shown and described.

12. The combination, with the frame A, the rear bed-plate B, the rock-shaft F, having the notched flanges $f$ at its ends, and the hand-lever attached to one end of the rock-shaft, of the teeth $F''$, connected to said rear bed-plate and each having a curved base, $g''$, an elongated hole, $f^6$, at one end of the curve of said base, and a hole, $f^7$, at the other end of said curve, and the screws $f^4 f^5$, passing through said holes, respectively, and entering said base-plate, substantially as and for the purpose set forth.

13. The combination, with the frame A, the bed-plate B, fitted to slide transversely therein, the rock-shaft F, pivoted in the frame, the crank-pins $f''$, and the lever $F''''$, attached to the rock-shaft, of the rods $F'''$, one of which rods is provided with a shoulder, $f'''$, to engage the lever, as shown and described.

14. The combination, with the frame A, bed-plate B, having the fixed stud $h''$, and the bar H' loosely secured to the bed-plate, of the lever H, pivoted to the bar H' and fitted loosely upon the stud $h''$, and having two holes at equal distances from the stud, the pin $h'''$ in the stud, the spring H'' between the pin $h'''$ and the lever H, and the pin H''', fixed in the bed-plate to register with the holes in the lever, as shown and described.

15. The combination, with the frame A and the frame I, fitted to slide thereon, as described, and provided with the ribs $i$, of the gibs I', the binding-screws I'', and the pushing-screws $i'$, the pushing-screws $i'$ having heads passing through openings in the gibs and shoulders acting upon the under sides of the gibs, and the binding-screws I'' also having heads passing through openings in the gibs and being arranged intermediately of the pushing-screws and acting upon the upper sides of the said gibs, substantially as and for the purpose set forth.

16. The combination, with the frame A, the frame I, fitted thereto and sliding thereon, as described, and the arm J, pivoted to frame I, of the friction-rod $j''$, pivoted at one end to the arm J and loosely supported at the other end in the frame I, and the friction-block J'', engaging the rod $j''$ and loosely attached to the frame A, substantially as shown and described.

17. The combination, with the yarn-guide arm J, pivoted to oscillate, and the friction-block J'', engaging the rod $j''$ and loosely fixed to the machine, of the rod $j''$, provided with the stud and a screw, J''', the arm J having a socket to receive the screw, as shown and described.

18. The combination of the main frame A, the frame I, fitted to slide longitudinally thereon, the cam-shifter L, fitted to the frame I, the shifter-stops $S^2$, each provided with a straight slot, $S^4$, and an angular slot, $S^5$, and the screws $S^3$, passing through the said slots into the frame A, substantially as shown and described.

19. The combination of the frame A, the stops $S^2$, each provided with a straight slot, $S^4$, and an angular slot, $S^5$, and three holes, N', the screws S passing through the said slots into the frame A, and the pin N, fitted in the frame A, to engage the pin-holes N', and a spring therefor, substantially as shown and described.

ISAAC WIXOM LAMB.

Witnesses:
ALF. C. COWHERD,
STELLA A. HUNT.